US008781801B2

(12) United States Patent
Takahashi et al.

(10) Patent No.: US 8,781,801 B2
(45) Date of Patent: Jul. 15, 2014

(54) METEOROLOGICAL PHENOMENA SIMULATION DEVICE AND METHOD

(75) Inventors: Keiko Takahashi, Yokosuka (JP); Ryo Onishi, Yokosuka (JP); Takeshi Sugimura, Yokosuka (JP)

(73) Assignee: Japan Agency for Marine-Earth Science and Technology, Yokosuka-shi (JP)

( * ) Notice: Subject to any disclaimer, the term of this patent is extended or adjusted under 35 U.S.C. 154(b) by 878 days.

(21) Appl. No.: 12/740,231

(22) PCT Filed: Oct. 29, 2007

(86) PCT No.: PCT/JP2007/071023
§ 371 (c)(1),
(2), (4) Date: Aug. 17, 2010

(87) PCT Pub. No.: WO2009/057190
PCT Pub. Date: May 7, 2009

(65) Prior Publication Data
US 2010/0305916 A1    Dec. 2, 2010

(51) Int. Cl.
*G06G 7/56* (2006.01)
*G06F 7/60* (2006.01)
*G06G 7/48* (2006.01)

(52) U.S. Cl.
USPC ...................................... 703/5; 703/2; 703/6

(58) Field of Classification Search
USPC ..................................................... 703/2, 5, 6
See application file for complete search history.

(56) References Cited

U.S. PATENT DOCUMENTS

| | | | |
|---|---|---|---|
| 7,076,368 B2* | 7/2006 | Wada | 702/3 |
| 7,089,115 B2* | 8/2006 | Chapman et al. | 702/3 |
| 7,996,192 B2* | 8/2011 | Repelli et al. | 703/2 |

OTHER PUBLICATIONS

Lei et al., An application of the RAMS/FLUENT system on the multi-scale numerical simulation of the urban surface layer-A preliminary study, Mar. 1, 2007, Advances in Atmospheric Sciences, vol. 24, Issue 2, ISSN: 0256-1530, pp. 271-280.*

Hoyano et al., Development of Thermal Simulation Tool for Urban Block Design-Based on Numerical Simulation System Using 3D-CAD, 2004, Proceedings of the 10th International Conference on Computing in Civil and Building Engineering, Germany, pp. 1-8.*

(Continued)

*Primary Examiner* — Kamini S Shah
*Assistant Examiner* — Juan Ochoa
(74) *Attorney, Agent, or Firm* — Westerman, Hattori, Daniels & Adrian, LLP

(57) ABSTRACT

A meteorological simulation method acquires the geomorphological data of a predetermined region, acquires the meteorological data of the predetermined region entirely or partially, acquires the 3D spatial data of a partial region in the predetermined region where the 3D space is defined by grids, calculates the meteorological data in the predetermined region by using the geomorphological data and the meteorological data, acquires the attribute data of each grid including the geometrical factors of the grids, calculates heat radiation energy of every grid based on the attribute data of each grid, calculates the flux between a solid object or the like and the ground surface and the pressure variation on the boundary of the solid object and the atmosphere based on the heat radiation energy thus calculated, calculates the weather data on the boundary of the solid object or the like and the atmosphere based on the flux and pressure variation, and calculates the meteorological data in the predetermined region furthermore after a predetermined time by outputting the calculated meteorological data to an output unit and using the meteorological data on the boundary of the solid object or the like and the atmosphere.

4 Claims, 10 Drawing Sheets

(56) References Cited

OTHER PUBLICATIONS

Cherqui et al., A Step Toward the Global Assessment of District Projects: Solar Indicators and Way to Quantify Them, Aug. 15-18, 2005, Building Simulation, Ninth International IBPSA Conference, Montreal, Canada, pp. 167-174.*

Xiaoming et al., Numerical Simulation of Wind and Temperature Fields over Beijing Area in Summer, 2005, ACTA Meteorologica Sinica, vol. 19., No. 1, pp. 120-127.*

Mihalakakou et al., simulation of the Urban Heat Island Phenomenon in Mediterranean Climates, 2004, Pure applied geophysics, 161, pp. 429-451.* lino and Hoyano, Development of a method to predict the heat island potential using remote sensing and GIS data, 1996, Energy and Buildings 23, pp. 199-205.*

Brown et al., A Study of the Oklahoma City Urban Heat Island Using Ground Measurements and Remote Sensing, Aug. 23-26, 2004, Los Alamos National Laboratory, pp. 1-9.*

Assessment of the Microclimatic and Human Comfort Conditions in a Complex Urban Environment: Modelling and Measurements, 2006, Building and Environment 41, pp. 1713-1722.*

Hagishima, Aya et al.; "An Organic Analysis for Quantitative Estimation of Heat Island by the Revised Architecture-Urban-Soil-Simultaneous Simulation Model, AUSSSM Part.1 Theoretical Frame of the Model and Results of Standard Solution", Journal of Architecture, Planning, and Environmental Engineering, No. 550, Mar. 2001, p. 79-86.

Hagishima, Aya et al.; "An Organic Analysis for Quantitative Estimation of Heat Island by the Revised Architecture-Urban-Soil-Simultaneous Simulation Model, AUSSSM Part 2 Quantitative Analysis Based on a Series of Numerical Experiments", Journal of Architecture, Planning, and Environmental Engineering, No. 553, Mar. 2002, p. 91-98.

Hagishima, Aya et al.; "An Organic Analysis for Quantitative Estimation of Heat Island by the Revised Architecture-Urban-Soil-Simultaneous Simulation Model, AUSSSM Part 3 Sensitivity Analysis on Factors of Urban Heat Island Under Various Meteorological Regions", Journal of Architecture, Planning, and Environmental Engineering, No. 601, Mar. 2006, p. 43-50.

Fujibe, Fumiaki; "The Urban Heat Island", Tenki, No. 54, Jan. 2007, p. 9-12.

Kusaka, Hiroyuki et al.; "Mechanism for Nocturnal Hot and Humid Conditions Using an Urban Weather Model"; Tenki, No. 51(2), Feb. 2004, p. 95-98.

Chen, Hong et al.; "Study on Impact of Buildings on Outdoor Thermal Environment Using Coupled Simulation of Convection, Radiation, and Conduction"; Proceedings of the 19th Symposium on Computational Fluid Dynamics, 2005, C1-3.

Yamaguchi, Katsuhito et al.; "Numerical Simulation of One- Dimensional Urban Atmosphere Using Urban Canopy Model"; 8th Symposium on Environmental Engineering '98 Koen Ronbunshu, No. 98-6,Jul. 10, 1998, p. 392-395.

Harayama, Kazuya et al.; "Study on Urban Climate Analysis Based on Meso-scale Climate Model Incorporated with the Urban Canopy Model"; Journal of Environmental Engineering, No. 592, Jun. 2005, p. 75-82.

Takahashi, Keiko; "Multi-Scale Multi-physics simulations of weather forecasting and climate projection"; 20th Proceedings on Organizing Committee on Computational Fluid Dynamics Symposium, Dec. 20, 2006, p. 1-2.

Notification of Transmittal of Translation of the International Preliminary Report on Patentability (Form PCT/IB/338) of International Application No. PCT/JP2007/071023 mailed Jun. 10, 2010 with Forms PCT/IB/373 and PCT/ISA/237.

Sato, Taiki et al.; "Estimation of thermal sensation index SET* within urban canopy layer based on numerical climate model"; Summaries of Technical Papers of Annual Convention, Sep. 2005, Parts 2 and 5.

International Search Report dated Jan. 15, 2008 cited in International Application No. PCT/JP2007/071023 (1 pg).

* cited by examiner

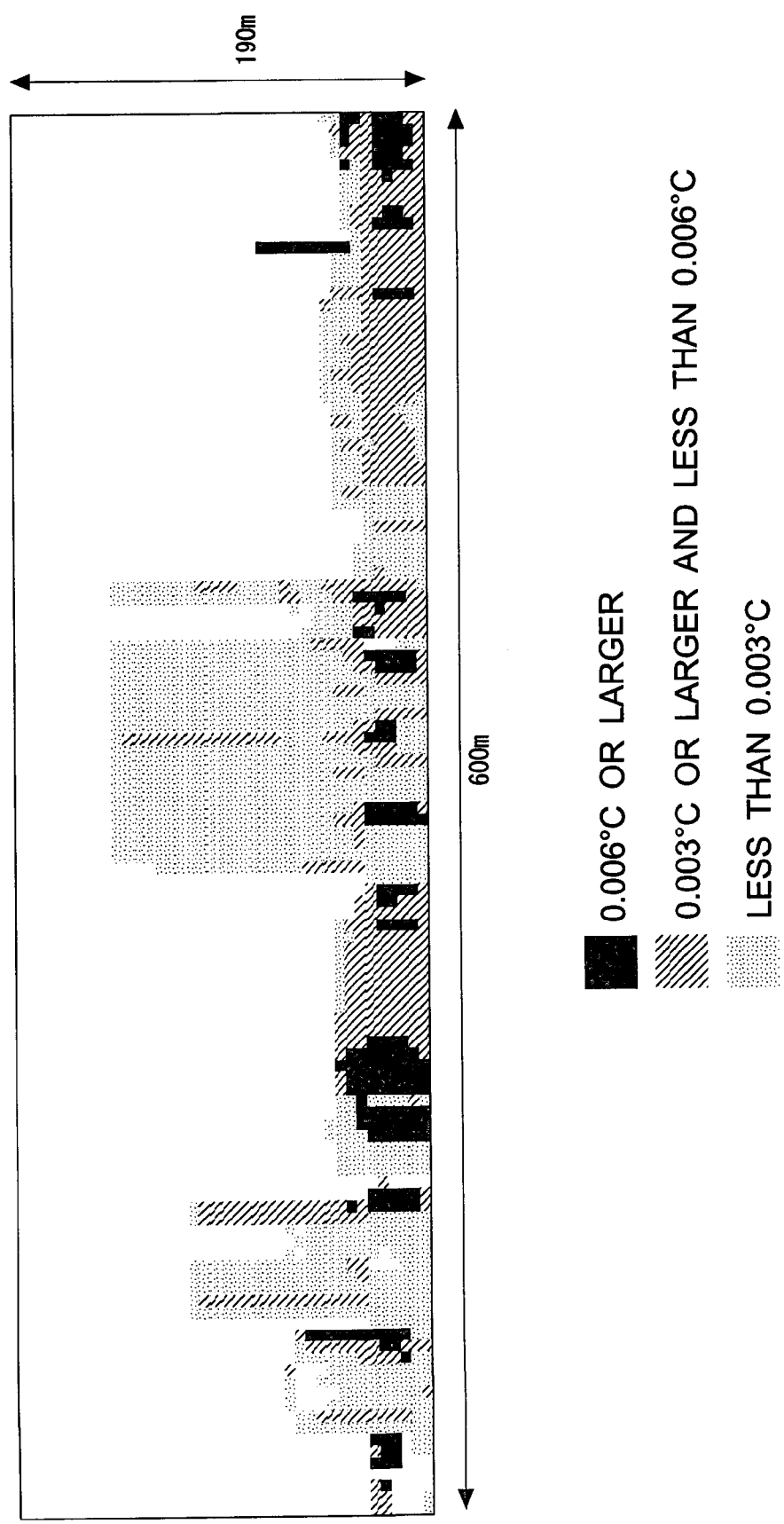

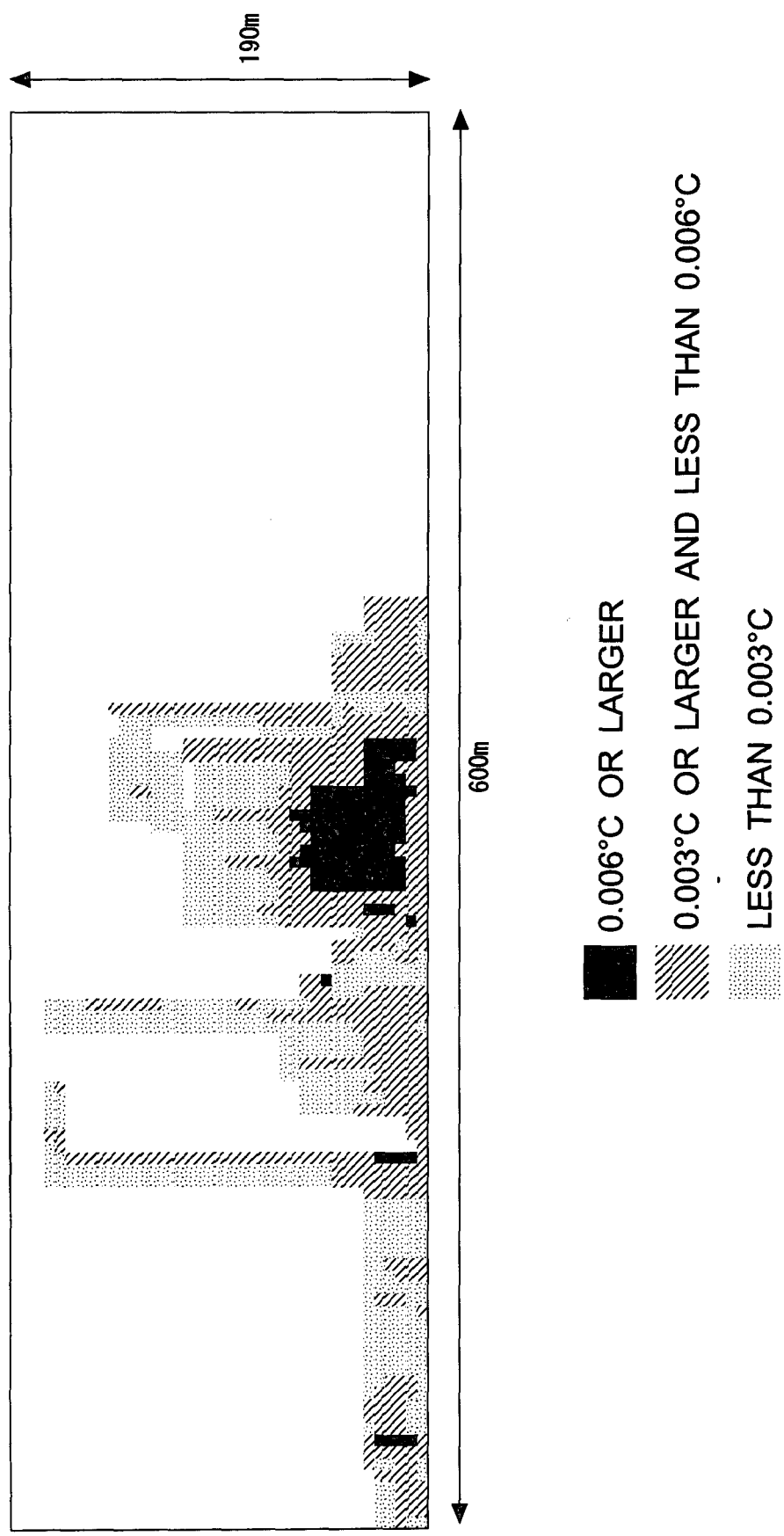

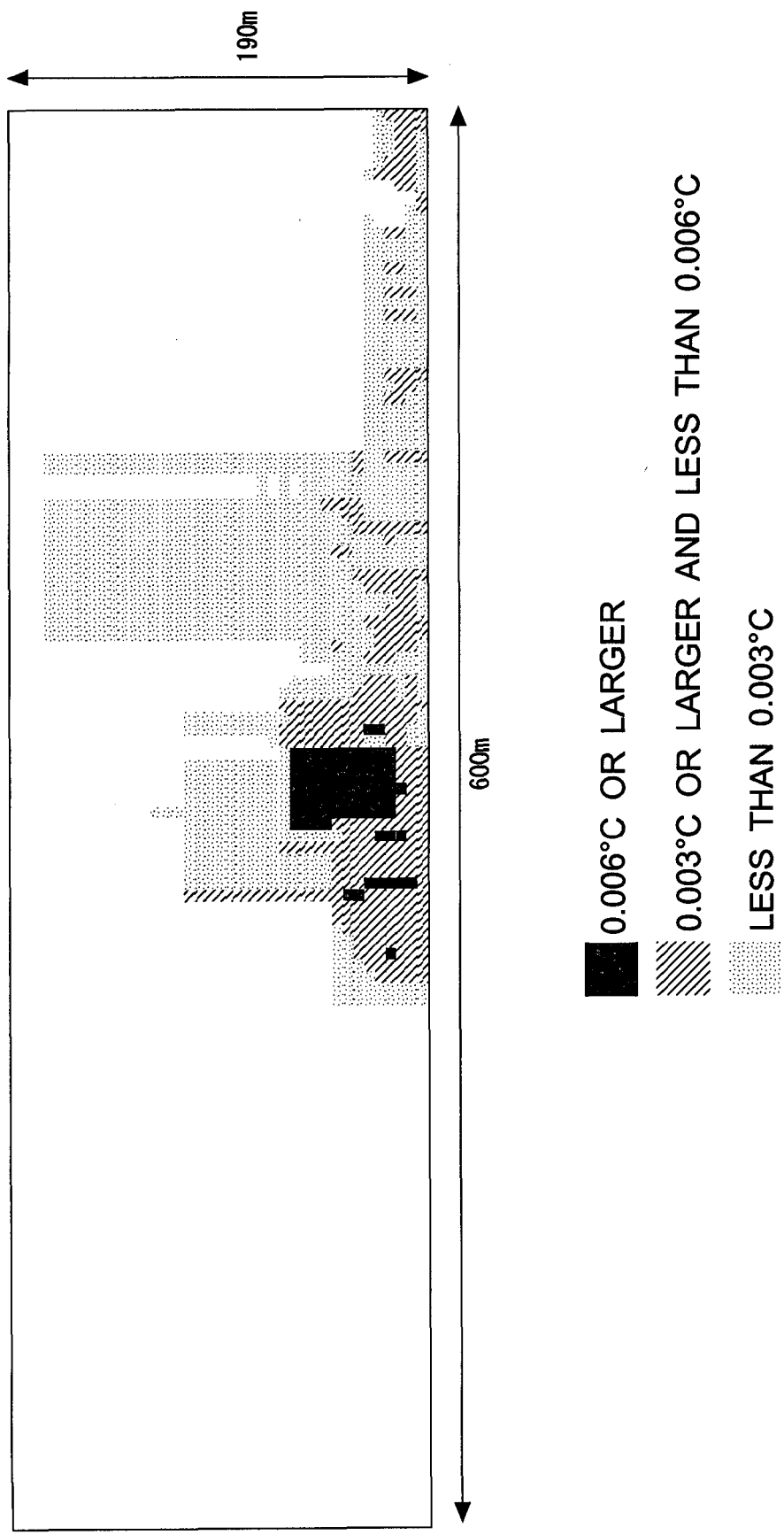

METEOROLOGICAL PHENOMENA SIMULATION DEVICE AND METHOD

TECHNICAL FIELD

The present invention relates to a meteorological simulation that takes into account three-dimensional contours and the like of a real urban space.

BACKGROUND ART

A phenomenon in which the temperature of an urban area becomes higher than the temperatures of the surrounding areas is called "heat island phenomenon."

In recent years, the heat island phenomenon in cities has been said to be a cause of worsening urban environments in conjunction with the influences of global warming. It is said that in the last 100 years, the global average temperature has risen by 0.6° C., while in Japan the temperatures in large cities have risen by 2.4° C., and the temperature in Tokyo has risen by 2.9° C.

The heat island does not necessarily refer to only a high-temperature area confined exclusively to city blocks. For example, it is known that, on a summer afternoon, a vast heat island is formed extending from adjacent areas of Tokyo to inland areas of the Kanto Plain. A temperature rise on the scale of the inland area may directly affect meteorological changes, and hence there has been an increasing demand for meteorological prediction that takes into account influences not only from the atmosphere but also from adjacent areas of the heat island and adjacent sea thereof.

In recent years, regarding such concentrated torrential rainfalls as urban concentrated torrential rainfalls, for which the heat island is considered to be one of the causes, there is known the fact that a convergence field of wide-area winds blowing from inland areas surrounding the heat island and from adjacent sea thereof has a significant influence on the distribution of the rainfall and the amount thereof.

In order to clarify the mechanisms of such phenomena that may directly result in disasters and to make predictions thereon, it is necessary to provide such a simulation model that is capable of establishing direct cause-effect relations between meso-scale meteorological phenomena and environments typical of cities, that is, decrease in sky factor, distribution of shadows caused by buildings, radiation from the buildings and reflection thereof, heat storage effect of walls and roads, decline in wind speed among the buildings, and the like, which are regarded as factors characterizing the heat island.

Conventionally, many numerical urban simulations have used anyone of a model in which a building space in a city is represented by a slab model and a model in which the building space is represented by a canopy model.

In the slab model, it is difficult to express complex changes in heat balance in the building space, and there is a tendency to overestimate heating in city areas during daytime.

In the canopy model, urban surfaces are treated as street canyons, and hence it is possible to take into account the factors characterizing the building space in the city (urban canopy), such as the sky factor, the shadow factor, the reflection of radiation, the heat storage effect of the walls, and decline in wind speed within the canopy. However, the canopy model is based on the assumption that the buildings within the urban canopy are arranged in a regular manner. Accordingly, the sky factor, the shadow factor, the reflection of radiation, the heat storage effect of the walls, the decline in wind speed within the canopy, and the like are insufficient for reproducing or making a prediction on heat retention, heat storage, and the like for an ideal condition, that is, uniform arrangement of identically-shaped buildings.

Non-patent Document 1: Kazuya Harayama, Ryozo Ooka, Shuzo Murakami, Shinji Yoshida, Masahiro Setojima, Hiroaki Kondo: "STUDY ON URBAN CLIMATE ANALYSIS BASED ON MESO-SCALE CLIMATE MODEL INCORPORATED WITH THE URBAN CANOPY MODEL", Journal of Environmental Engineering, Architectural Institute of Japan, 2005, No. 592, pp. 75-82.

Non-patent Document 2: Fumiaki Fujibe: "THE URBAN HEAT ISLAND", Tenki, 2007, No. 54(1), pp. 9-12.

Non-patent Document 3: Hong Chen, Ryozo Ooka, Hong Huang, Madoka Nakashima: "STUDY ON IMPACT OF BUILDINGS ON OUTDOOR THERMAL ENVIRONMENT USING COUPLED SIMULATION OF CONVECTION, RADIATION AND CONDUCTION", Proceedings of the 19th Symposium on Computational Fluid Dynamics, 2005, C1-3.

Non-patent Document 4: Taiki Sato, Shuzo Murakami, Ryozo Ooka, Yoichi Kawamoto: "ESTIMATION OF STANDARD EFFECTIVE TEMPERATURE (SET) AT THE PEDESTRIAN AREA BASED ON NUMERICAL CLIMATE MODEL", Summaries of Technical Papers of Annual Convention, Architectural Institute of Japan, 2005.

Non-patent Document 5: Aya Hagishima, Jun Tanimoto, Tadahisa Katayama, Kenji Ohara: "AN ORGANIC ANALYSIS FOR QUANTITATIVE ESTIMATION OF HEAT ISLAND BY THE REVISED ARCHITECTURE-URBAN-SOIL-SIMULTANEOUS SIMULATION MODEL (AUSSSM): PART 1 THEORETICAL FRAME OF THE MODEL AND RESULTS OF STANDARD SOLUTION", Journal of Architecture, Planning and Environmental Engineering, Architectural Institute of Japan, 2001, No. 550, pp. 79-86.

Non-patent Document 6: Aya Hagishima, Jun Tanimoto, Tadahisa Katayama, Kenji Ohara: "AN ORGANIC ANALYSIS FOR QUANTITATIVE ESTIMATION OF HEAT ISLAND BY THE REVISED ARCHITECTURE-URBAN-SOIL-SIMULTANEOUS SIMULATION MODEL (AUSSSM): PART 2 QUANTITATIVE ANALYSIS BASED ON A SERIES OF NUMERICAL EXPERIMENTS", Journal of Architecture, Planning and Environmental Engineering, Architectural Institute of Japan, 2002, No. 553, pp. 91-98.

Non-patent Document 7: Aya Hagishima, Jun Tanimoto, Fumihiro Asano: "AN ORGANIC ANALYSIS FOR QUANTITATIVE ESTIMATION OF HEAT ISLAND BY THE REVISED ARCHITECTURE-URBAN-SOIL-SIMULTANEOUS SIMULATION MODEL (AUSSSM): PART 3 SENSITIVITY ANALYSIS ON FACTORS OF URBAN HEAT ISLAND UNDER VARIOUS METEOROLOGICAL REGIONS", Journal of Environmental Engineering, Architectural Institute of Japan, 2006, No. 601, pp. 43-50.

Non-patent Document 8: Hiroyuki Kusaka, Fujio Kimura: "MECHANISM FOR NOCTURNAL HOT AND HUMID CONDITIONS USING A WEATHER MODEL", Tenki, 2004, No. 51(2), pp. 95-98.

DISCLOSURE OF THE INVENTION

Problem to be Solved by the Invention

The present invention has an object to provide a meteorological simulation device that reproduce or make a prediction on reality of meteorological phenomena in real urban blocks and adjacent areas thereof.

Means for Solving the Problem

In order to achieve the object described above, the present invention employs the following means.

The present invention provides a meteorological simulation device including:

topographic data acquiring means for acquiring topographic data containing a latitude, a longitude, an elevation, and a geological feature of a predetermined area;

meteorological data acquiring means for acquiring, as meteorological data, at least one of a wind direction, a wind speed, a temperature, an air pressure, a humidity, and a piece of information equivalent thereto from a whole or a part of sites of the predetermined area;

three-dimensional data acquiring means for acquiring three-dimensional space data obtained by defining a three-dimensional space by means of a plurality of grids, the three-dimensional space data containing a plurality of three-dimensional objects and a ground surface of a partial area of the predetermined area;

meteorological data calculating means for calculating, based on the topographic data and the meteorological data, meteorological data of the predetermined area;

grid attribute data acquiring means for acquiring form factors of the plurality of grids of the partial area of the predetermined area, and attribute data of each grid, which contains an area and a reflectance of the each grid;

thermal radiation energy calculating means for calculating, as thermal radiation energy of the each grid, based on the area of the each grid, the form factor, the reflectance of the each grid, and a temperature of the each grid, which is calculated by the meteorological data calculating means, a sum of thermal radiation energy emitted from an own grid and thermal radiation energy obtained through reflection of a thermal radiation ray emitted from each grid;

boundary calculating means for calculating, based on the thermal radiation energy calculated by the thermal radiation energy calculating means, a flux between an atmosphere, and the plurality of three-dimensional objects and the ground surface, and pressure variation at boundaries between the atmosphere, and the plurality of three-dimensional objects and the ground surface;

boundary meteorological data calculating means for calculating, based on the flux and the pressure variation, meteorological data of the boundaries between the atmosphere, and the plurality of three-dimensional objects and the ground surface; and output means for outputting the meteorological data calculated by the meteorological data calculating means to an output device, in which the meteorological data calculating means further calculates meteorological data of the predetermined area of after a predetermined time period based on the meteorological data of the boundaries between the atmosphere, and the plurality of three-dimensional objects and the ground surface.

According to the present invention, the meteorological data of the entire calculation area may be calculated taking into account the influences and the like from the three-dimensional objects and the ground surface of the partial area of the calculation area.

The present invention may be implemented as a meteorological simulation method having the same features as the meteorological simulation device according to the present invention, a program for causing an information processing device (computer) to function as the meteorological simulation device, and a recording medium storing the program.

Effects of the Invention

According to the present invention, it is possible to provide the meteorological simulation device that reproduce or make a prediction on reality of meteorological phenomena in real urban blocks and adjacent areas thereof.

BRIEF DESCRIPTION OF THE DRAWINGS

FIG. 8 is a diagram illustrating simulation results of surface temperatures of west-side walls of buildings and the like in an actual urban space.

FIG. 9 is a diagram illustrating simulation results of surface temperatures of north-side walls of buildings and the like in an actual urban space.

FIG. 10 is a diagram illustrating simulation results of surface temperatures of south-side walls of buildings and the like in an actual urban space.

DESCRIPTION OF SYMBOLS

Figure 1:
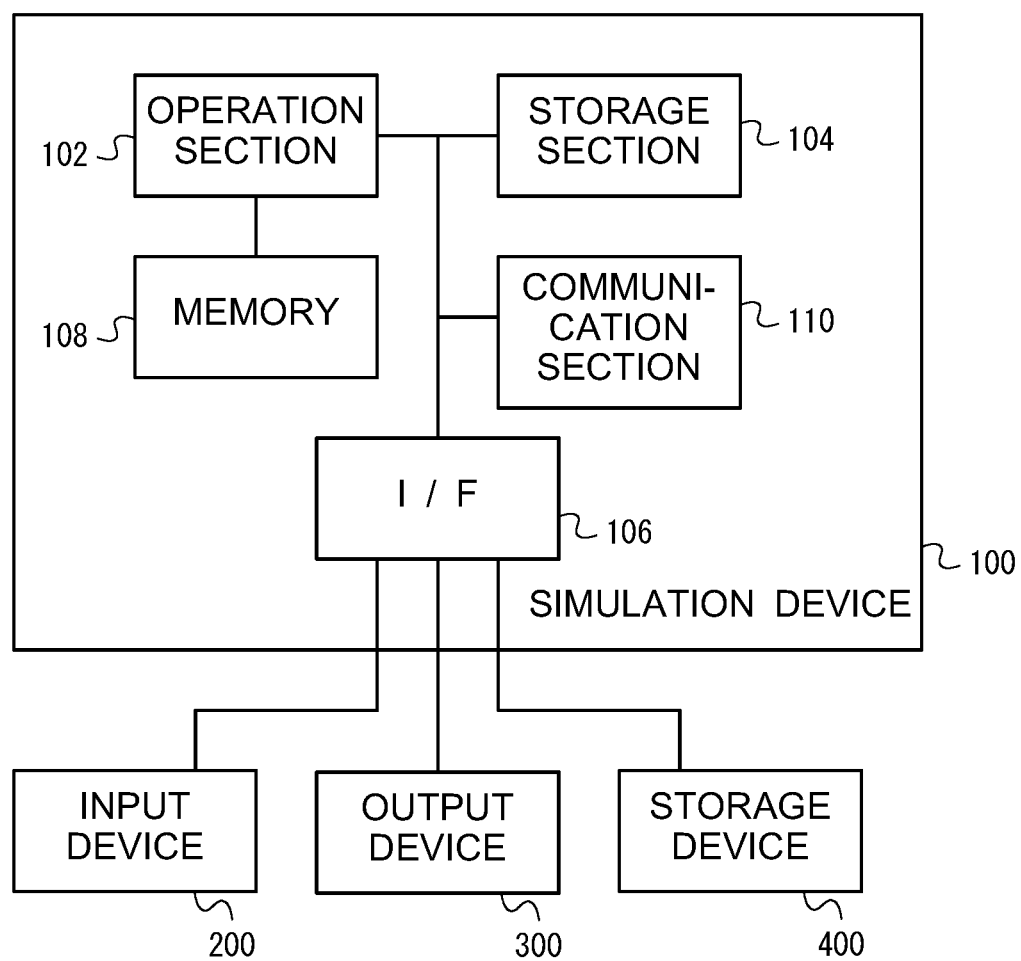
FIG. 1 is a diagram illustrating a system configuration.

100 simulation device
102 operation section
104 storage section
106 interface (I/F)
108 memory
110 communication section
200 input device
300 output device
400 storage device

BEST MODE FOR CARRYING OUT THE INVENTION

With reference to the drawings, description is given of an embodiment of the present invention. The description of the embodiment is given by way of example, and the present invention is not limited to the configuration of the embodiment.

Embodiment

System Configuration

FIG. 1 is a diagram illustrating a system configuration of this embodiment. A system according to this embodiment includes a simulation device 100, an input device 200, an output device 300, and a storage device 400.

The simulation device 100 includes an operation section 102 that mainly performs calculation (operation), a storage section 104 that stores initial data, program, and the like, an interface (I/F) 106 that performs input/output with respect to an external device, a memory 108 in which a program and data to be executed by the operation section 102 are expanded, and a communication section 110 having the function of communicating with the outside.

The operation section 102 is capable of functioning as topographic data acquiring means, meteorological data acquiring means, three-dimensional data acquiring means, meteorological data calculating means, grid attribute data acquiring means, thermal radiation energy calculating means, boundary calculating means, boundary meteorological data calculating means, and output means. Alternatively, one or a plurality of those means may function in another independent operation section than the operation section 102. Each of those components may be configured as a program executed on the operation section 102 of the simulation device 100. Alternatively, some or all of the components may be configured by hardware circuitry.

The input device 200 includes a pointing device and the like, such as a keyboard and a mouse. The output device 300 is a computer including a display such as an LCD or a CRT monitor, a printer, and the like. The storage device 400 includes a hard disk drive (HDD), a flexible disk drive, a CD drive, a DVD drive, and the like. The storage device 400 is further capable of recording data and the like stored in the storage section 104 on a recording medium inserted into the storage device 400. The storage device 400 may be used as alternate means to the storage section 104.

<Processing Flow>

Figure 2:
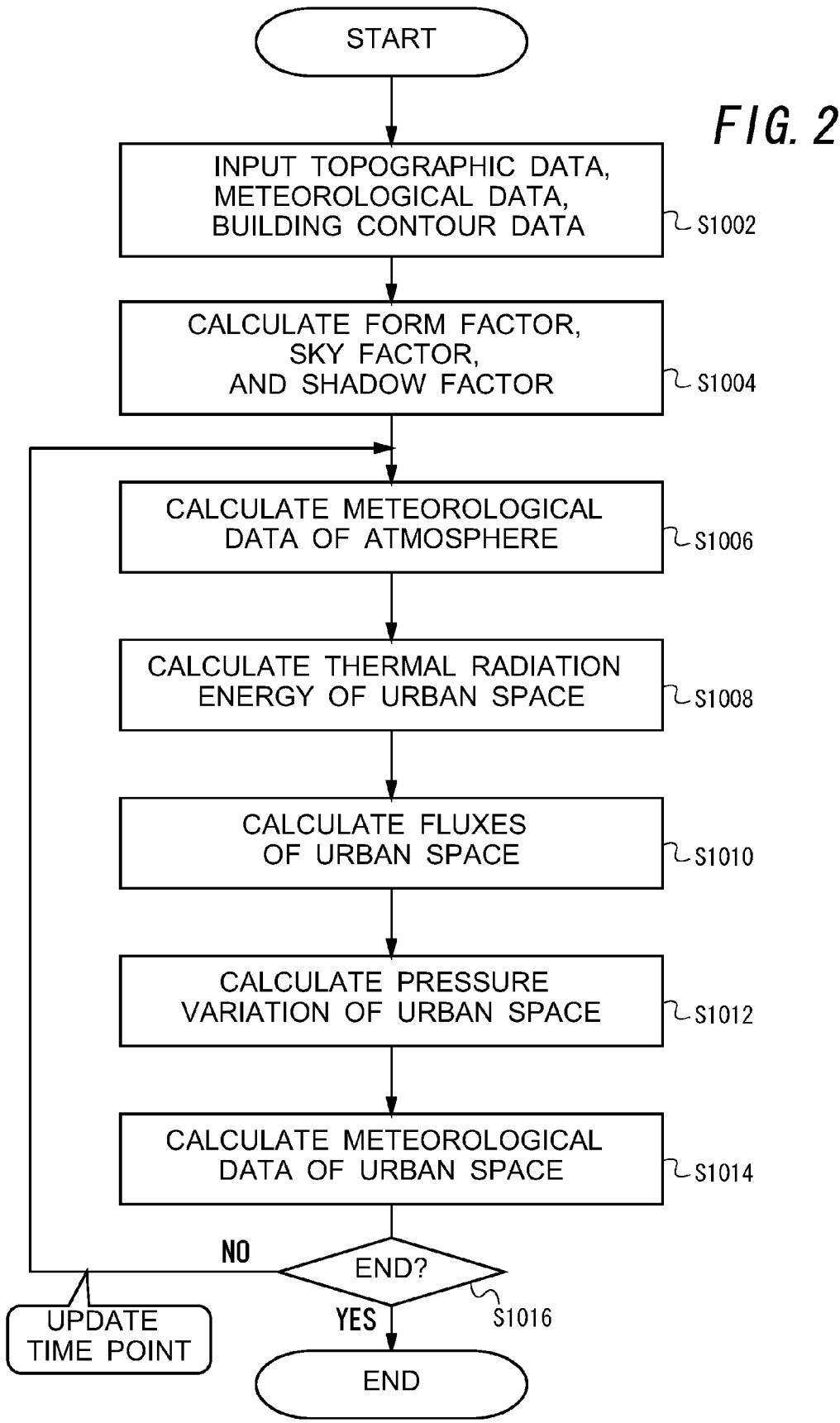
FIG. 2 is a diagram illustrating a flow showing a simulation method.

FIG. 2 is a diagram illustrating a processing flow of a meteorological simulation according to this embodiment.

First, topographic data, meteorological data, data on three-dimensional contours of an urban space are input with regard to a subject area of the simulation (S1002).

The topographic data may contain latitudes, longitudes, elevations, geological features, etc. of the subject area of the simulation. The geological features herein represent attributes of ground surfaces (characteristics of such grounds as bare land, lawn, and paved surface). The geological feature has an influence on an emissivity of the ground surface. The emissivity is one of the attributes of the ground surface. A difference in geological feature causes a difference in emissivity of the ground surface. The meteorological data may contain winds (wind directions, wind speeds, etc.), temperatures, air pressures, humidities, water vapor amounts, etc. of all or some of the sites located within the subject area of the simulation. The three-dimensional contours of the urban space are defined by specifying three-dimensional coordinates that correspond to real three-dimensional objects including artificial structures (walls of buildings, rooftop surfaces, road surfaces, etc.), natural structures (trees, cliffs, ground surfaces, etc.; clouds and the like may also be contained), and the like. The three-dimensional coordinates may be provided using any coordinate system, such as an orthogonal coordinate system or a polar coordinate system. The three-dimensional contours of the urban space may be input only for a part of the subject area of the simulation.

The topographic data, the meteorological data, and the three-dimensional contour data may be defined, for example, by a user using the input device 200 to input those pieces of data. The input pieces of data are stored in the storage section 104.

The storage section 104 and the memory 108 may store the topographic data, the meteorological data, and the three-dimensional contour data that are input from the input device. Alternatively, the storage section 104 and the memory 108 may store the topographic data, the meteorological data, and the three-dimensional contour data that are stored in the storage device 400 in advance. Alternatively, the storage section 104 and the memory 108 may store the topographic data, the meteorological data, and the three-dimensional contour data that are received by the communication section 110.

The operation section 102 acquires, onto the memory, the topographic data, the meteorological data, data on the three-dimensional contours of the three-dimensional objects, constants, variables, and the like that are necessary for the simulation, and then uses those pieces of data for the simulation. The term "acquire" may refer to storing data input from the input device 200 in the memory, reading data stored in advance in the storage section 104 or the storage device 400 onto the memory, reading data received by a communication device onto the memory, and the like.

Next, a form factor, a sky factor, and a shadow factor are calculated (S1004).

The operation section 102 of the simulation device 100 divides the three-dimensional contours defined in S1002 into a predetermined number of grids (plane elements). Alternatively, the operation section 102 may divide the three-dimensional contours into grids having a predetermined area. Data on the grids of the three-dimensional contours is stored in the storage section 104. The user may designate the division number, the area of the grid, and the like. Through controlling the division number, the area of the grid, and the like, the accuracy of calculation results may be controlled. Further, the area of each grid is determined based on the three-dimensional contours, and is then stored in the storage section 104.

Further, the operation section 102 may acquire data on the three-dimensional contours of three-dimensional objects that are divided in advance. The term "acquire" may refer to storing data input from the input device 200 in the memory, reading data stored in advance in the storage section 104 or the storage device 400 onto the memory, reading data received by the communication device onto the memory, and the like.

The operation section 102 calculates, for each grid of the three-dimensional contours divided into a plurality of grids, the form factors with respect to all the other grids. Further, the operation section 102 calculates, for each grid of the three-dimensional contours divided into the plurality of grids, the sky factor and the shadow factor. The form factor, the calculation of the form factor, and the calculation of the sky factor and the shadow factor are described later in detail. The form factor calculated for each grid is stored in the storage section 104.

The simulation device 100 may acquire the form factor, the sky factor, and the shadow factor that are calculated by another device or the like.

Next, the meteorological data of the atmosphere is calculated (S1006). The operation section 102 uses the topographic data and the meteorological data to calculate, based on a meteorological model, the meteorological data of the subject area of the simulation, such as winds, temperatures, humidities, and air pressures in the atmosphere. In the meteorological model, the subject area of the simulation may be divided into grids having an arbitrary size. In an area in which the three-dimensional contours of the urban space are provided, grids to be used in the meteorological model may be set on the same scale as the grids of the three-dimensional contours of the urban space. On the other hand, in another area, grids larger than the grids of the three-dimensional contours of the urban space may be used. The meteorological model is described later in detail.

Next, the thermal radiation energy is calculated (S1008). The operation section 102 creates matrix element data so as to calculate the thermal radiation energy of the urban space. As for the temperature of each grid, the temperature calculated in S1006 is used as a boundary condition. The emissivity of each grid is provided, for example, through an input from the user using the input device 200. The area and the form factor of each grid are determined in S1004. The pieces of data including the emissivity, the temperature, the area, the form factor, etc. of each grid are stored in the storage section 104. Based on the pieces of data stored in the storage section 104, the operation section 102 creates the matrix element data for thermal radiation energy calculation.

Based on the created matrix element data, the operation section 102 calculates the thermal radiation energy of each grid. The calculation of the thermal radiation energy is described later in detail. The operation section 102 outputs a calculation result of the thermal radiation energy for each grid to such predetermined devices as the output device 300, the storage device 400, and the storage section 104.

Next, fluxes of the grids of the urban space are calculated (S1010). The operation section 102 uses a thermal radiation energy $G_i$ calculated in S1008 to calculate a flux to a wall surface, a flux to a room wall, a downward flux to the ground surface, an upward flux from the ground surface, and a wall convective heat transfer flux. Further, the operation section 102 calculates pressure variation of the urban space (S1012). The pressure variation is a function of the temperature. Accordingly, instead of the pressure variation, temperature change may be used. The respective fluxes and the pressure variation are described later in detail.

Next, the operation section 102 updates the meteorological data of the urban space (S1014). The operation section 102 uses the calculated fluxes and pressure variation to calculate the meteorological data containing boundary temperatures between the atmosphere and buildings, ground surfaces, etc. of the urban space after a predetermined short-time step. With this configuration, the meteorological data containing temperatures obtained by taking into account the three-dimensional contours and the like of the urban space after the predetermined short-time step may be obtained. The operation section 102 may calculate such meteorological data that is not the temperature but equivalent to the temperature.

After that, the operation section 102 judges whether or not the calculation is to be ended (S1016). In a case where the calculation is not to be ended (S1016; No), the operation section 102 updates a time point, and then calculates the meteorological data of the atmosphere after the predetermined short-time step by using the meteorological data containing the temperatures obtained by taking into account an influence of the urban space after the predetermined short-time step (S1006).

The meteorological data and the like calculated by the operation section 102 may be output from the output device 300 as appropriate. Further, the meteorological data and the like calculated by the operation section 102 may be stored in the storage section 104 and the storage device 400 as appropriate, and may also be transmitted to an external device with the use of the communication section 110.

The creation and the calculation of data are performed by the operation section 102 expanding, in the memory 108, programs stored in the storage section 104 and executing the programs. At this time, data input from the input device 200, data stored in advance in the storage section 104 or the storage device 400, or data received by the communication section 110 is used as appropriate.

(Form Factor)

Figure 3:
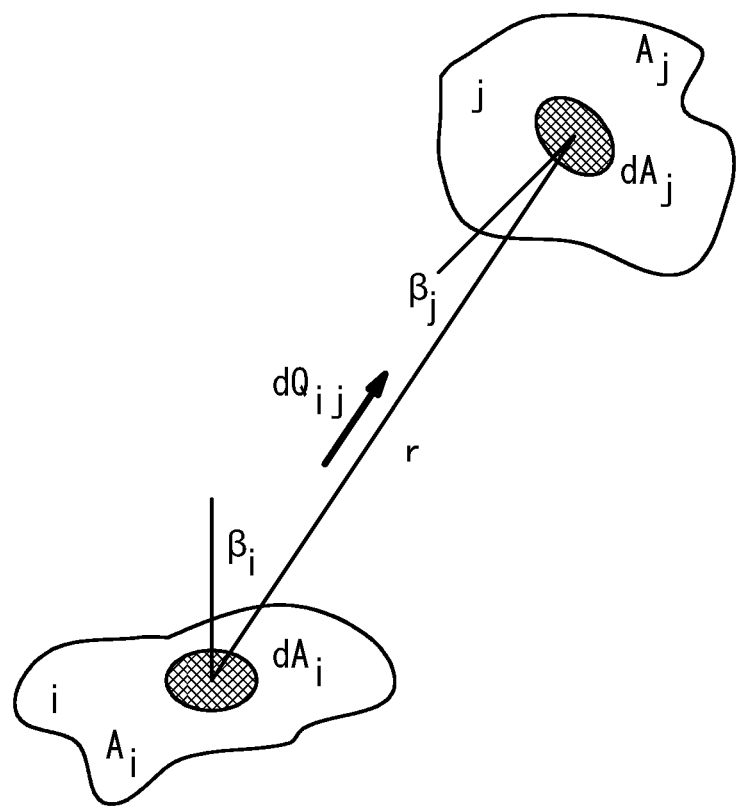
FIG. 3 is a diagram illustrating a form factor.

FIG. 3 is a diagram illustrating the form factor.

As illustrated in FIG. 3, it is assumed that there are planes i and j having areas $A_i$ and $A_j$, respectively. Thermal radiation energy emitted omnidirectionally from the plane i is denoted by $E_i A_i$, where the irradiance of the plane i is denoted by $E_i$. Energy that directly enters the plane j from the plane i is denoted by $Q_{ij}$. Assuming that, of the energy emitted omnidirectionally from the plane i, a ratio of energy directly entering the plane j is denoted by $F_{ij}$, $F_{ij}$ is expressed as follows.

$$F_{ij} = \frac{Q_{ij}}{E_i A_i} \quad \text{[Expression 1]}$$

$F_{ij}$ described above is the form factor.

As illustrated in FIG. 3, a distance between the plane i and the plane j is denoted by r. Here, in the plane i and the plane j, small finite plane elements $dA_i$ and $dA_j$ are defined. Angles formed between the line connecting the plane i and the plane j and normals to the plane i and the plane j are denoted by $\beta_i$ and $\beta_j$, respectively. Radiation energy $dQ_{ij}$ released per unit time toward $dA_j$ within a solid angle $d\omega_j$ centered at the finite plane element $dA_i$ may be determined as follows by using a radiance $I_{bi}$ of the plane i.

$$dQ_{ij} = I_{bi} \cdot dA_i \cdot \cos\beta_i \cdot d\omega_j \quad \text{[Expression 2]}$$

Here, according to the definition of the solid angle, the following is satisfied.

$$d\omega_j = \frac{dA_j \cos\beta_j}{r^2} \quad \text{[Expression 3]}$$

Thus, the radiation energy $dQ_{ij}$ is expressed as follows.

$$dQ_{ij} = I_{bi} \frac{\cos\beta_i \cos\beta_j}{r^2} dA_i dA_j \quad \text{[Expression 4]}$$

Further, conversely, radiation energy $dQ_{ji}$ released per unit time from $dA_j$ to $dA_i$ is expressed as follows.

$$dQ_{ji} = I_{bj} \frac{\cos\beta_i \cos\beta_j}{r^2} dA_i dA_j \quad \text{[Expression 5]}$$

A net radiation heat transfer amount $dQ_{net,ij}$ between $dA_i$ and $dA_j$ is obtained based on the following expression.

$$E_i = \pi I_{bi} = \sigma T_i^4 \quad \text{[Expression 6]}$$

In a case where the temperatures of the plane i and the plane j are $T_i$ and $T_j$, respectively, $dQ_{net,ij}$ is expressed as follows.

$$dQ_{net,ij} = dQ_{ij} - dQ_{ji} = \sigma(T_i^4 - T_j^4)\frac{\cos\beta_i \cos\beta_j}{\pi r^2} dA_i dA_j \quad \text{[Expression 7]}$$

A net radiation heat transfer amount between the plane i and the plane j is obtained by performing integration on the expression described above.

$$Q_{net,ij} = \sigma(T_i^4 - T_j^4) A_i F_{ij} = \sigma(T_i^4 - T_j^4) A_j F_{ji} \quad \text{[Expression 8]}$$

where $F_{ij}$ and $F_{ji}$ are the form factors between the plane i and the plane j, and are expressed as follows, respectively.

$$F_{ij} = \frac{1}{A_i} \int_{A_i} \int_{A_j} \frac{\cos\beta_i \cos\beta_j}{\pi r^2} dA_i dA_j \quad \text{[Expression 9]}$$

$$F_{ji} = \frac{1}{A_j} \int_{A_i} \int_{A_j} \frac{\cos\beta_i \cos\beta_j}{\pi r^2} dA_i dA_j \quad \text{[Expression 10]}$$

The form factors between the plane i and the plane j are determined by geometric relative position relation between the plane i and the plane j.

(Calculation of Form Factor)

When the form factors are determined, a Monte Carlo method is employed. Specifically, from the grids of, for example, a wall, photons are emitted in random directions to simulate the behavior of the photons. Relation between a grid that has emitted photons and a grid that has blocked photons in the course of tracking the individual photons is detected.

Focus is given to a given grid on a wall of, for example, a building or a road. Hereinbelow, a wall represented by an arbitrary grid i (i=1~n) is assumed to be a grid plane i (i=1~n).

With the Monte Carlo method, in order to improve the calculation accuracy, an enormous number of particles (photons) are required. For example, in a case where $10^6$ photons are emitted from the respective grids, an error from an analytical solution is of the order of $10^{-4}$. Depending on the accuracy required for the form factors, the number of photons to be emitted may be increased or decreased. Due to the use of the Monte Carlo method, even in the case of complicated three-dimensional contours, such as a building, the form factors may be easily calculated with high accuracy.

The form factors may be determined using the analytical solution based on the three-dimensional contours.

Figure 4:
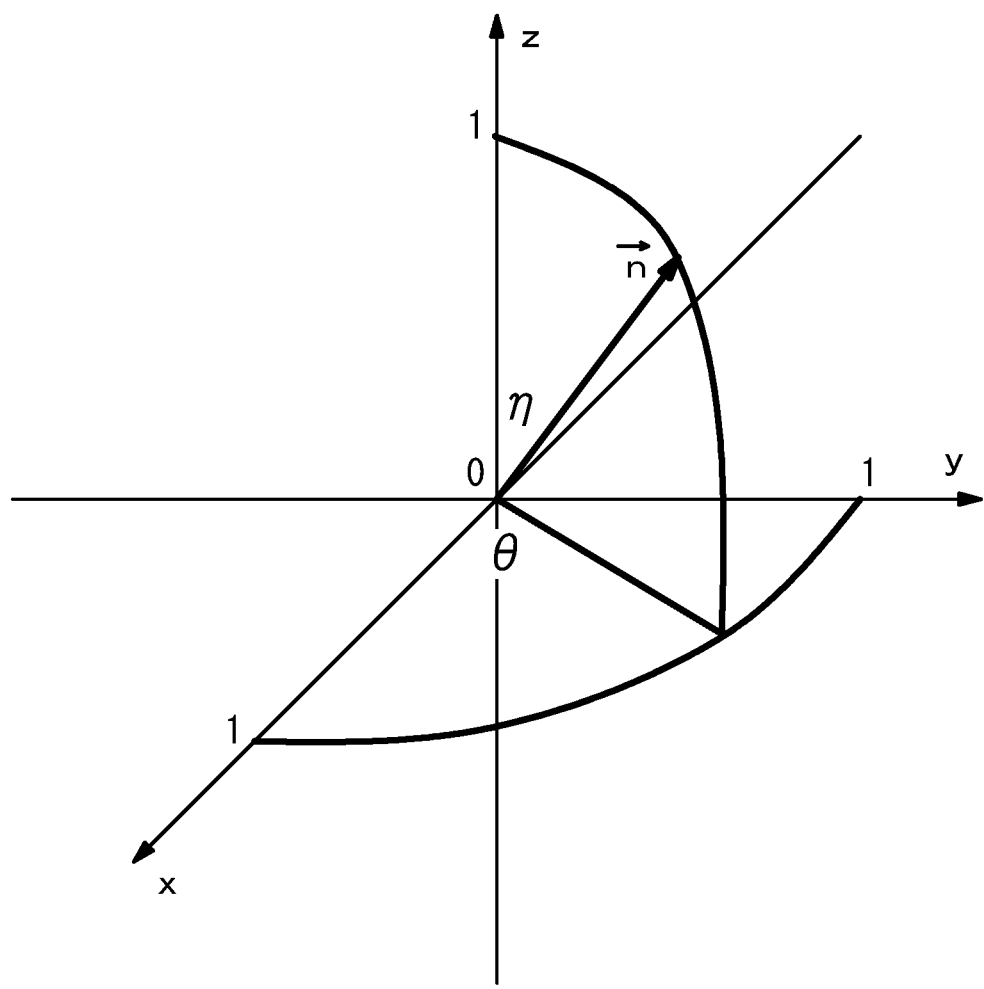
FIG. 4 is a diagram illustrating a unit vector in a radiation direction.

FIG. 4 is a diagram illustrating a unit vector in a radiation direction. In a case where a beam is emitted in a direction defined by an azimuth angle θ and a zenith angle η, the unit vector in the radiation direction is expressed as follows.

$$\vec{n} = (\sin\eta \cos\theta, \sin\eta \sin\theta, \cos\eta) \quad \text{[Expression 11]}$$

In this case, a surface element on a unit sphere having the emission point at the center is expressed as follows.

$$dS = \sin\eta \, d\eta \, d\theta \quad \text{[Expression 12]}$$

In a case where Lambert's cosine law applies, in terms of θ, a uniform radiation probability is obtained, but, in terms of η, a radiation probability in a corresponding direction is proportional to cos η.

Thus, an integral element is expressed as follows.

$$\cos\eta \, dS = \sin\eta \cos\eta \, d\eta \, d\theta = \frac{1}{2} d(\sin^2\eta) d\theta \quad \text{[Expression 13]}$$

As for θ and η, uniform random numbers $R_\theta$ and $R_\eta$ are set as follows, respectively.

$$\theta = 2\pi R_\theta \quad \text{[Expression 14]}$$

$(0 \le R_\theta \le 1)$ $$\sin\eta \cos\eta \, d\eta = c \, dR_\eta \quad \text{[Expression 15]}$$

$(0 \le R_\eta \le 1)$ where c is a constant. By integrating both sides thereof, the following expression is derived.

$$c = \frac{1}{2} \quad \text{[Expression 16]}$$

Then, based on Expression 17, Expression 18 is derived.

$$\frac{1}{2} d(\sin^2\eta) = \frac{1}{2} dR_\eta \quad \text{[Expression 17]}$$

$$\sin^2\eta = R_\eta \quad \text{[Expression 18]}$$

In this manner, in the case where Lambert's cosine law applies, a frequency with which a grid emits photons is expressed as follows.

$$\vec{n} = (\sqrt{R_\eta} \cos 2\pi R_\theta, \sqrt{R_\eta} \sin 2\pi R_\theta, \sqrt{1-R_\eta}) \quad \text{[Expression 19]}$$

According to the emission frequency of photons described above, each grid emits a predetermined number of photons. Each of the photons corresponds to a predetermined amount of energy. Accordingly, by counting the number of photons that have directly entered a grid, the form factor may be determined. By increasing the number of photons to be emitted, the form factor having high accuracy may be determined.

Figure 5:
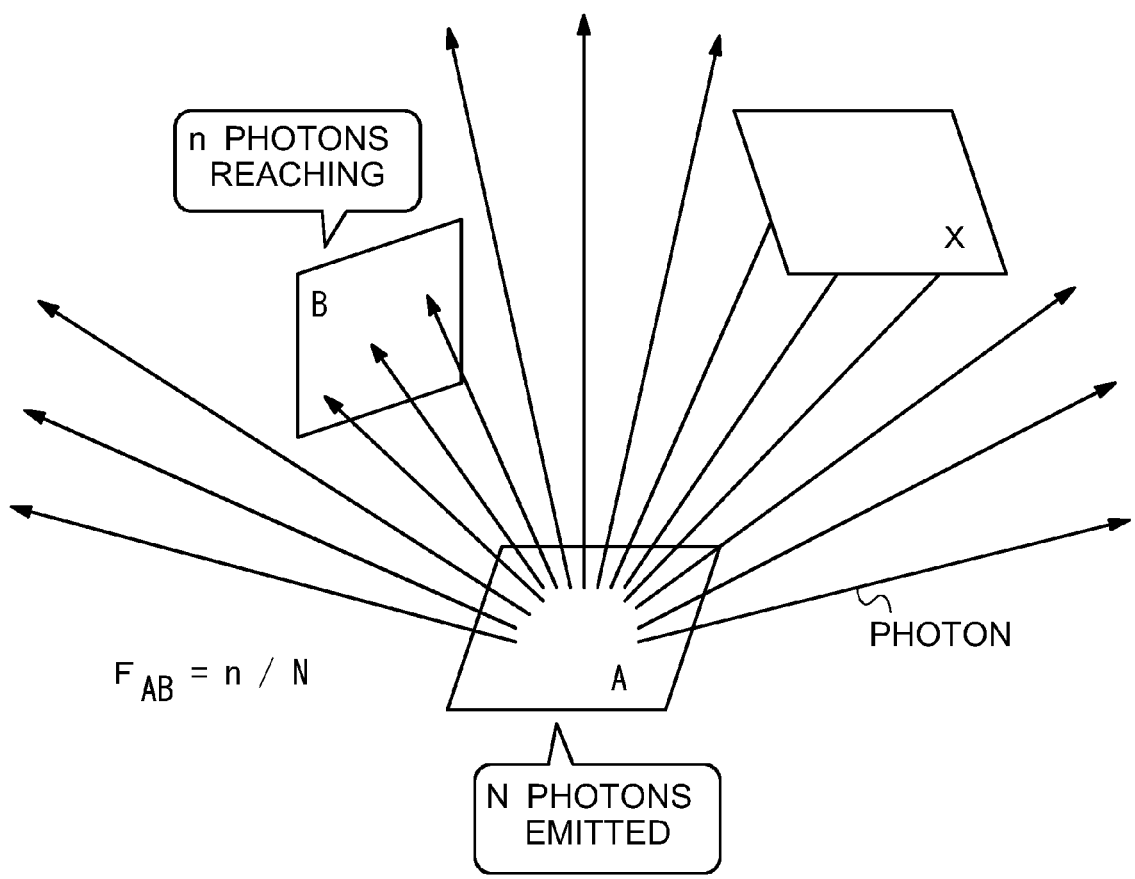
FIG. 5 is a diagram illustrating a state of photons emitted from a grid plane A.

FIG. 5 is a diagram illustrating a state of photons emitted from a grid plane A. Some of the photons emitted from the grid plane A according to the emission frequency reach a grid plane B directly. Accordingly, assuming that a total number of the photons emitted from the grid plane A is N, and the number of the photons reaching the grid plane B directly from the grid plane A is n, a form factor $F_{AB}$ is expressed as follows.

$$F_{AB} = \frac{n}{N} \quad \text{[Expression 20]}$$

(Calculation of Sky Factor)

The sky factor refers to a ratio of the sky viewed from a grid plane. In other words, the sky factor is a ratio of photons passing through the atmosphere without being blocked by another wall or the ground, to the photons emitted from a grid plane.

Accordingly, a sky factor $f_{sky}$ of each grid plane is determined as follows.

$$f_{sky} = 1 - \frac{\text{number of photons blocked by wall or the like when form factor is determined}}{\text{number of emitted photons}} \quad \text{[Expression 21]}$$

(Calculation of Shadow Factor)

The shadow factor is a ratio of a time period in which a grid of a calculation subject is in the shade during a predetermined time period, to a time period starting when the grid is selected as the calculation subject and ending after a lapse of the predetermined time period. Similarly to the calculation of the form factor, the shadow factor may be calculated by emitting photons from each grid plane in a direction in which the sun is expected to be located during a predetermined time period, and examining whether or not the photons are blocked by a building or the like. Unlike the calculation of the form factor, in the case of the calculation of the shadow factor, the photons are emitted from the grid planes only in the direction in which the sun is expected to be located during the predetermined time period.

The shadow factor is expressed by the following expression.

$$x_{shadow} = \frac{\text{number of blocked photons}}{\text{number of emitted photons}} \quad \text{[Expression 22]}$$

(Meteorological Model)

Here, as an example of the meteorological model, description is given of an atmospheric component of the multi-scale simulator for the geoenvironment (MSSG-A). The present invention is not limited to this meteorological model, and any meteorological model may be used.

The atmospheric component of the multi-scale simulator for the geoenvironment is a meteorological model that is aimed at meso-scale meteorological phenomena and is applicable to the entire sphere and an area thereof.

The MSSG-A has mainly the following features:
(1) the three-dimensional fully compressible Navier-Stokes equation is used;
(2) the Yin-Yang lattice system is employed for the entire sphere, and one-way coupling or two-way coupling to an area is possible;
(3) for a discretization method, there are employed a fifth-order upwind difference scheme, a third-order Runge-Kutta method, and a splitting method of horizontally explicit-vertically implicit (HE-VI) type;
(4) as a turbulence model, a large eddy simulation (LES) model is employed, which enables reproducing a detailed flow on the turbulence scale;
(5) a plurality of cloud microphysics models and radiation models may be used, and a land surface model and a sea ice model may be introduced as well; and
(6) as basic equations for atmospheric flow, a fully compressible non-hydrostatic equation, a continuity equation (mass conservation equation), and an equation of state are used.

In the atmospheric component of the multi-scale simulator for the geoenvironment, the topographic data is provided as an initial condition, and the meteorological data of a given time point, such as winds, temperatures, humidities, and pressures, is input as parameters. Then, based on the topographic data, the winds, the temperatures, the humidities, and the pressures of the time point in the entire calculation area may be calculated on a grid basis. In the atmospheric component of the multi-scale simulator for the geoenvironment, based on those pieces of meteorological data, predictions on clouds, rain, snow, hail, and the like in the atmosphere may be calculated. When themeteorological data is calculated, there is no need to provide the meteorological data of all the grids as input data. This is because in the atmospheric component of the multi-scale simulator for the geoenvironment, data is appropriately interpolated with regard to a grid having no data.

Further, in the atmospheric component of the multi-scale simulator for the geoenvironment, based on the meteorological data output on a grid basis, the meteorological data may be calculated for each grid of the entire calculation area after a lapse of an arbitrary time period.

The size of a grid, which serves as a unit for inputting and outputting the meteorological data, may be controlled according to the area. Thus, in the urban space, the density of grids is made higher so as to provide more detailed meteorological data, while in other areas than the urban space, the density of grids is made lower to provide the meteorological data.

As primitive equations for the MSSG-A, fully compressible equations are employed under non-hydrostatic conditions. Those equations are described in the following.

An equation (prediction formula) for a $\lambda$ component of the wind is expressed by the following expression.

$$\frac{\partial}{\partial t}(\rho u) = -A(\rho u) + \rho f_r v - \rho f_\lambda w + \rho \frac{\tan\varphi}{a} uv - \rho \frac{uw}{a} - \frac{1}{M^{\frac{1}{2}} a \cos\varphi} \frac{\partial M^{\frac{1}{2}} p'}{\partial \lambda} - \frac{1}{M^{\frac{1}{2}} a \cos\varphi} \frac{\partial M^{\frac{1}{2}} M^{13} p'}{\partial z^*} + \rho F_\lambda \quad \text{[Expression 23]}$$

An equation (prediction formula) for a $\lambda$ component of the wind is expressed by the following expression.

$$\frac{\partial}{\partial t}(\rho v) = -A(\rho v) - \rho f_r u + \rho f_\varphi w - \rho \frac{\tan\varphi}{a} u^2 - \rho \frac{vw}{a} - \frac{1}{M^{\frac{1}{2}} a} \frac{\partial M^{\frac{1}{2}} p'}{\partial \varphi} - \frac{1}{M^{\frac{1}{2}} a} \frac{\partial M^{\frac{1}{2}} M^{23} p'}{\partial z^*} + \rho F_\varphi \quad \text{[Expression 24]}$$

An equation (prediction formula) for a z component of the wind is expressed by the following expression.

$$\frac{\partial}{\partial t}(\rho w) = -A(\rho w) + \rho f_\varphi u - \rho f_\lambda v - \rho \frac{u^2 + v^2}{a} - \frac{1}{M^{\frac{1}{2}}} \frac{\partial p'}{\partial z^*} - \rho g + \rho F_{z^*} \quad \text{[Expression 25]}$$

An equation (prediction formula) for pressure change is expressed by the following expression.

$$\frac{\partial}{\partial t} p' = -A(p) - (\gamma - 1) p A(1) + \rho(\gamma - 1) Q \quad \text{[Expression 26]}$$

Further, the continuity equation is expressed by the following expression.

$$\frac{\partial \rho}{\partial t} = -A(\rho) \quad \text{[Expression 27]}$$

The equation of state of gas is expressed by the following expression.

$$p = \rho RT \quad \text{[Expression 28]}$$

It should be noted that, in terms of a given variable x, A(x) is defined by the following expression.

$$A(x) \equiv \frac{1}{M^{\frac{1}{2}} a \cos\varphi} \frac{\partial}{\partial \lambda}\left(M^{\frac{1}{2}} xu\right) + \frac{1}{M^{\frac{1}{2}} a} \frac{\partial}{\partial \varphi}\left(M^{\frac{1}{2}} \cos\varphi xv\right) + \frac{1}{M^{\frac{1}{2}}} \frac{\partial}{\partial z^*}(xw^*) \quad \text{[Expression 29]}$$

Thus,

-continued $$\rho w^* \equiv \frac{1}{M^{\frac{1}{2}}a\cos\varphi}\frac{\partial}{\partial\lambda}\left(M^{\frac{1}{2}}M^{13}\rho u\right)+ \qquad \text{[Expression 30]}$$

$$\frac{1}{M^{\frac{1}{2}}a}\frac{\partial}{\partial\varphi}\left(M^{\frac{1}{2}}M^{23}\rho v\right)+\frac{1}{M^{\frac{1}{2}}}\frac{\partial}{\partial z^*}(\rho w)$$

where $$z^* = z_T \frac{z-z_G}{z_T-z_G} \qquad \text{[Expression 31]}$$

$$M^{\frac{1}{2}} = 1-\frac{z_G}{z_T} \qquad \text{[Expression 32]}$$

$$M^{\frac{1}{2}}M^{13} = \left(\frac{z^*}{z_T}-1\right)\frac{\partial z_G}{\partial \lambda}$$

$$M^{\frac{1}{2}}M^{23} = \left(\frac{z^*}{z_T}-1\right)\frac{\partial z_G}{\partial \varphi}$$

$$p = p_0 + p' \qquad \text{[Expression 33]}$$
$$\rho = \rho_0 + \rho'$$
$$\frac{1}{M^{\frac{1}{2}}}\frac{\partial p_0}{\partial z^*} = -\rho_0 g$$

$$\gamma = \frac{C_p}{C_v}, \qquad \text{[Expression 34]}$$

and also where
[Expression 35]
u: east-west component of wind
v: north-south component of wind
w: vertical component of wind
[Expression 36]
$z_T$: upper-limit altitude of calculation area
$z_G$: elevation
[Expression 37]
λ: longitude (east-west)
φ: latitude (north-south)
r: vertical
z: altitude
a: radius of earth
$f_\lambda$, $f_\varphi$, $f_r$: Coriolis parameters in λ, φ, and r directions
g: gravitational acceleration
[Expression 38]
T: temperature
ρ: density
p: pressure
$\rho_0$: basic state of density
$p_0$: basic state of air pressure
[Expression 39]
R: gas constant
$C_v$: specific heat at constant volume
$C_p$: specific heat at constant pressure
[Expression 40]
F: external force term
Q: heating term The basic state refers to an atmospheric field that is horizontally uniform and is in a hydrostatic equilibrium state. The basic state of density refers to a vertical distribution of density in the atmospheric field that is horizontally uniform and is in the hydrostatic equilibrium state. Further, the basic state of air pressure refers to a vertical distribution of air pressure in the atmospheric field that is horizontally uniform and is in the hydrostatic equilibrium state. The external force term is a term representing a force exerted in a system of the calculation subject by an influence from outside the system of the calculation subject. The heating term is a term representing the amount of heat provided in the system of the calculation subject by an influence from outside the system of the calculation subject.

Pieces of meteorological data to be calculated on the atmosphere are ρu, ρv, ρw, ρ', and p', and, by calculating temporal changes of those variables, the flow of the atmosphere may be predicted.

By substituting the meteorological data as the initial conditions for the calculation, the meteorological data of the urban space that is obtained through the numerical calculation with regard to the urban space, and the like into the equations described above, there may be obtained meteorological data of the entire calculation area including the urban space after a lapse of an arbitrary time period from the initial time, in which influences from the urban space are contained.

(Thermal Radiation Energy)

With regard to a radiation heat transfer process in a non-black body plane, which is an arbitrary grid plane, it is necessary to take into account the reflection of a thermal radiation ray emitted from another arbitrary grid plane. Thermal radiation energy $G_i$ released into a space per unit area per unit time is expressed by the following expression.

$$G_i = \varepsilon_i \sigma T_i^4 + \frac{(1-\alpha_i)}{A_i}\sum_{k=1}^{n}A_k G_k F_{ki} \qquad \text{[Expression 41]}$$

$G_i$: thermal radiation energy released per unit area per unit time from grid plane i (radiosity, irradiance)[W/m²]
$\alpha_i$: absorptivity of grid plane i
$\epsilon_i$: emissivity of grid plane i
σ: Stefan-Boltzmann constant (5.67×10⁻⁸ W/m²K⁴)

The first term of the right side represents thermal radiation energy emitted from the own grid plane. The second term of the right side represents thermal radiation energy obtained from the reflection of a thermal radiation ray emitted from an arbitrary grid plane.

Here, with regard to the arbitrary grid plane i (i=1~n), the following expressions are satisfied.

$$\alpha_i = \epsilon_i \qquad \text{[Expression 42]}$$

and $$A_k F_{ki} = A_i F_{ik} \qquad \text{[Expression 43]}$$

An emissivity ($\epsilon_i$) is determined based on, for example, the geological feature of a ground surface, or the material of a wall or the like. In the case of the black body, the emissivity is 1.

The temperature ($T_i$) and the emissivity ($\epsilon_i$) of the grid plane i are provided in advance. The area ($A_i$) of the grid plane i may be determined based on the three-dimensional contours of the building and the like. Further, the form factor ($F_{ij}$) is determined as described above.

Therefore, by solving the following simultaneous equations in terms of n conditional expressions for the thermal radiation energy $G_i$, the thermal radiation energy $G_i$ of each grid plane i (i=1~n) is determined. The matrix element data of this expression may be created based on the parameters described above (emissivity, temperature, etc.).

$$\begin{bmatrix} D_{11} - A_1/r_1 & D_{12} & \cdots & D_{1n} \\ D_{21} & D_{22} - A_2/r_2 & \cdots & D_{2n} \\ \vdots & \vdots & \ddots & \vdots \\ D_{n1} & D_{n2} & \cdots & D_{nn} - A_n/r_n \end{bmatrix} \begin{bmatrix} G_1 \\ G_2 \\ \vdots \\ G_n \end{bmatrix} = \begin{bmatrix} -A_1\varepsilon_1 E_1/r_1 \\ -A_2\varepsilon_2 E_2/r_2 \\ \vdots \\ -A_n\varepsilon_n E_n/r_n \end{bmatrix}$$ [Expression 44]

$D_{kl} = A_l F_{lk} = A_k F_{kl}$ $r_k = 1 - \varepsilon_k$ $E_k = \sigma_k T_k^4$ Further, a net radiation heat flux $q_{Ri}$ released from the plane i may be determined from the following expression based on a net radiation heat transfer amount $Q_{Ri}$ released from the plane i.

$$q_{Ri} = \frac{Q_{Ri}}{A_i} = G_i - \frac{1}{A_i}\sum_{k=1}^{n} A_k G_k F_{ki}$$ [Expression 45]

(Flux to Wall Surface)

Assuming that a number of a grid plane of a wall is $i_s$, a lattice number in an x-direction is $i_x$, and a lattice number in a y-direction is $j_y$, the flux to the surface of the grid plane of the wall is obtained from the following expression (1).

[Expression 46]

$$q_{wall}(i_s) = \tau_{atm} q_{solar}(i_x, j_y) \frac{\vec{n}_{solar} \cdot \vec{n}_w(i_s)}{\vec{n}_{solar} \cdot \vec{n}_{ground}}(1 - x_{shadow}(i_s)) + $$
$$(1 - \tau_{atm}) q_{solar}(i_x, j_y) \frac{1}{\vec{n}_{solar} \cdot \vec{n}_{ground}} f_{sky}(i_s) - G_{i_s} + $$
$$\frac{1}{A_{i_s}} \sum_{j_s} A_{j_s} G_{j_s} F_{j_s i_s} + q_{long}(i_x, j_y) f_{sky}(i_s)(1 - r_{i_s}) - q_{conv}(i_s)$$ (1)

where
[Expression 47]
$q_{wall}$: heat flux from wall surface to inner wall [W/m²]
$q_{solar}$: short-wave incident flux from sun to ground surface [W/m²]
$\vec{n}_{solar}$: unit vector in direction toward sun
$\vec{n}_w$: normal vector to wall surface
$\vec{n}_{ground}$: normal vector to ground surface
$\tau_{atm}$: atmospheric transmissivity
$f_{sky}(i_s)$: sky factor
$x_{shadow}(i_s)$: shadow factor
$G_{i_s}$: thermal radiation energy released from grid plane $i_s$ per unit area per unit time (radiosity, irradiance) [W/m²]
$A_{i_s}$: surface area [m²]
$F_{j_s i_s}$: form factor from plane $j_s$ to plane $i_s$
$\varepsilon_{i_s}$: emissivity
$\sigma$: Stefan-Boltzmann constant [W/m²K⁴]
$T_{i_s}$: wall surface temperature [K]
$r_{i_s}$: reflectance $q_{long}$: long-wave incident flux from atmosphere [W/m²]
$q_{conv}$: wall convective heat transfer flux (from wall surface to atmosphere) [W/m²]

The first term of the right side of the expression (1) represents a short-wave direct radiation flux received from the sun. The second term represents a short-wave radiation flux received, through scattering over the entire sky, from the sun. The third term represents a long-wave radiation flux received from the wall (thermal radiation energy: radiosity). The fourth term represents a long-wave flux entering this wall from the surrounding walls. The fifth term represents a long-wave incident flux entering the wall from the atmosphere. The sixth term represents a flux from the wall surface to the atmosphere, which is generated through the convective heat transfer.

As for the short-wave incident flux entering the ground surface from the sun and the long-wave incident flux entering the wall from the atmosphere, values determined through other means are provided in advance.

(Flux to Room Wall)

A heat flux from the room wall to the room is obtained from the following expression (2).

$$q_{room}(i_s) = b_{coeff}(T_{innerwall}(i_s) - T_{room})$$ (2)

where
[Expression 49]
$b_{coeff}$: convective heat transfer coefficient inside room [W/m²K]
$q_{room}$: heat flux from room wall to room [W/m²]
$T_{innerwall}$: inner wall temperature [K]
$T_{room}$: room temperature [K]

(Downward Flux to Ground Surface)

In order to obtain a downward flux to ground surface $Q_{down}$, it is necessary to add together contributions of a downward long-wave flux from atmosphere to ground surface $q_{long}$ and a long-wave flux entering ground surface from surrounding walls $\delta q_{long}$. The contribution from the surrounding walls is obtained through the following calculation.

[Expression 50]

$$Q_{down} = q_{long} + \delta q_{long}$$ (3)

$$\delta q_{long} = \frac{1}{A}\sum_{j_s} A_{j_s} G_{j_s} F_{j_s i_s} = [G_{i_s} - \varepsilon_{i_s}\sigma T_{i_s}^4]/\rho_{i_s}$$ (4)

Here, the second equality of the expression (4) is derived from the following expression for radiosity.

$$G_{i_s} = \varepsilon_{i_s}\sigma T_{i_s}^4 + \frac{r_{i_s}}{A_{i_s}}\sum_{j_s} A_{j_s} G_{j_s} F_{j_s i_s}$$ [Expression 51]

(Upward Flux from Ground Surface)

In order to obtain an upward flux from ground surface $q_{up}$, it is necessary to calculate the thermal radiation energy by adding, to an upward long-wave flux from the ground surface to the atmosphere, a contribution made by a long-wave flux that has entered the ground surface from the surrounding walls and has been reflected by the ground surface. The radiosity of the ground surface is a result of adding both the contributions, and hence the thermal radiation energy $Q_{up}$ is expressed as follows.

$$Q_{up} = G_{i_s}$$ [Expression 52]

(Wall Convective Heat Transfer Flux)

The wall convective heat transfer flux is obtained from the following expression.

$$q_{conv}(i_s) = -h_{coeff}(i_s)(T_{air}(i_s) - T_{i_s})$$ [Expression 53]

where

[Expression 54]

$h_{coeff}$: convective heat transfer coefficient [W/m²K]
$T_{air}$: temperature of atmosphere in contact with wall[K]
$u_{abs}$: wind speed [m/s]

(Pressure Variation)

The pressure variation refers to an amount obtained by converting an energy change of the atmosphere into a pressure change. The pressure variation per unit time resulting from the temperature change of the wall is expressed as follows.

$$\Delta p / \Delta t = (\gamma - 1) \frac{1}{M^{1/2}} \frac{1}{\Delta z^*} q_{conv}(i_s)$$ [Expression 55]

where

[Expression 56]

$\Delta p/\Delta t$: pressure variation term [Pa/s=W/m³]
$\gamma$: ratio between specific heat at constant pressure and specific heat at constant volume of dry atmosphere (specific heat ratio)

$$M^{1/2} : \text{metric term}\left(\frac{\partial z}{\partial z^*}\right)$$

$\Delta z^*$: lattice interval in vertical direction [m]

(Heat Conduction Between Outer Wall and Inner Wall)

Figure 6:
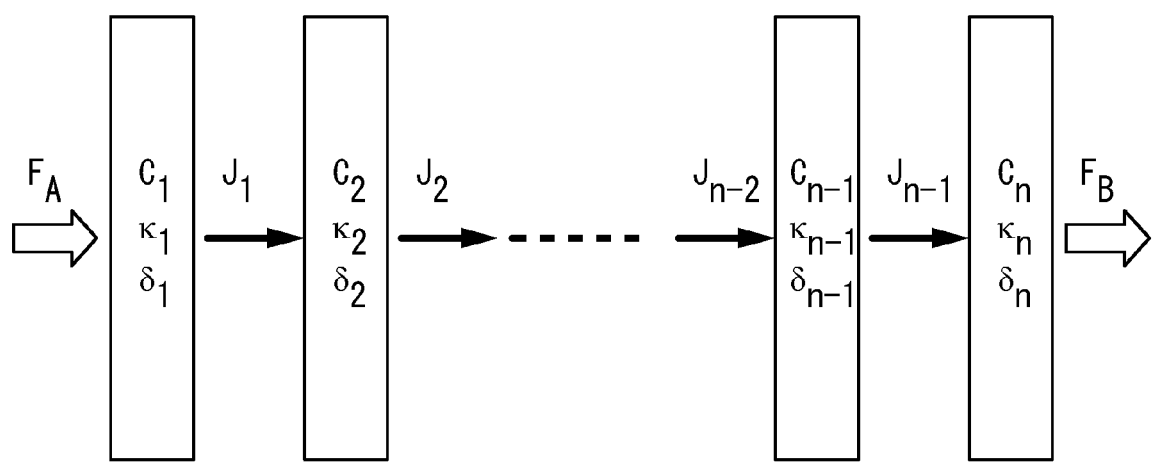
FIG. 6 is a diagram illustrating heat conduction between an outer wall and an inner wall.
Figure 6:
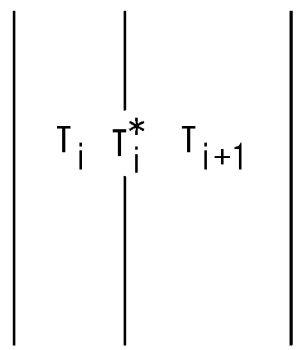
Figure 7:
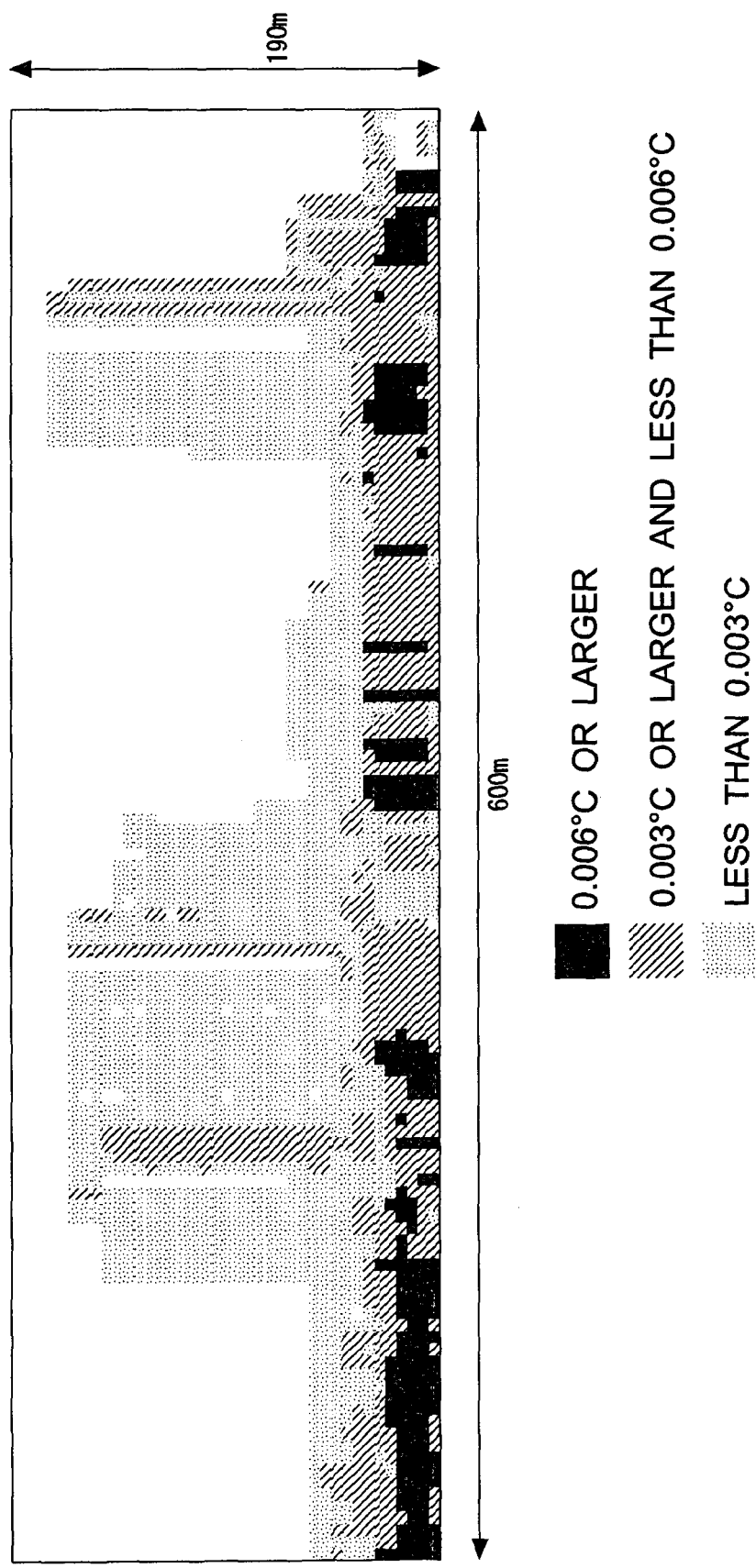
FIG. 7 is a diagram illustrating simulation results of surface temperatures of east-side walls of buildings and the like in an actual urban space.

FIG. 6 is a diagram illustrating heat conduction between an outer wall and an inner wall. The left-hand side corresponds to the side of the outer wall, and the right-hand side corresponds to the side of the inner wall. In order to determine the temperature of an arbitrary grid of each wall and the variation in pressure released from the wall, the wall is modeled using multiple layers of slabs.

Here, the following variables are used.

[Expression 57]

$F_A$: outer wall heat flux [W/m²]
$F_B$: inner wall heat flux [W/m²]
i: layer number
$J_i$: heat flux from layer i to layer i+1 [W/m²]
$C_i$: heat capacity of layer i [J/K]
$\kappa_i$: thermal conductivity of layer i [W/m/K]
$\delta_i$: thickness of layer i[m]
A: surface area [m²]
$T_i$: temperature of layer i[K]
$T_i^*$: boundary temperature between layer i and layer i+1 [K]

The following expression is a basic equation for a heat conduction model.

$$C\frac{\partial T}{\partial t} = -\nabla J = \nabla(\kappa \nabla T)$$ [Expression 58]

A building is assumed to be a hollow frame structured by a roof and walls, and a first-order heat conduction multi-layered model is solved for the roof of the building and the walls thereof grouped depending on the direction, taking into account the heat capacity. The room temperature is provided as the boundary condition, and is assumed to be uniform and constant on the wall. The heat conductions of the building and the ground may be determined by the expression described above.

Considering the fact that a difference between input amount and output amount of the heat flux of each layer contributes to a temperature rise of the layer, the multi-layered model may be solved from the following expressions.

$$A(F_A - J_1) = A\delta_1 C_1 \frac{dT_1}{dt}$$ [Expression 59]

$$A(J_1 - J_2) = A\delta_2 C_2 \frac{dT_2}{dt}$$

$$\vdots$$

$$A(J_{m-2} - J_{m-1}) = A\delta_{m-1} C_{m-1} \frac{dT_{m-1}}{dt}$$

$$A(J_{m-1} - F_B) = A\delta_m C_m \frac{dT_m}{dt}$$

where $$F_A = h_{coeff}(T_{air} - T_1)$$

$$F_B = b_{coeff}(T_n - T_{room})$$ [Expression 60]

A heat flux $J_i$ between layers is calculated as follows.

$$J_i = \frac{\kappa_i(T_i - T_i^*)}{\delta_i/2} = \frac{\kappa_{i+1}(T_i^* - T_{i+1})}{\delta_{i+1}/2}$$ [Expression 61]

From this expression, the following expression is obtained.

$$T_i - T_i^* = \frac{\kappa_{i+1}}{\kappa_i} \frac{\delta_i}{\delta_{i+1}}(T_i^* - T_{i+1})$$ [Expression 62]

Accordingly, $$\left(1 + \frac{\kappa_{i+1}}{\kappa_i} \frac{\delta_i}{\delta_{i+1}}\right) T_i^* = T_i + \frac{\kappa_{i+1}}{\kappa_i} \frac{\delta_i}{\delta_{i+1}} T_{i+1}$$ [Expression 63]

Thus, the temperature $T_i^*$ between layers is obtained as follows.

$$T_i^* = \frac{T_i + \frac{\kappa_{i+1}}{\kappa_i} \frac{\delta_i}{\delta_{i+1}} T_{i+1}}{1 + \frac{\kappa_{i+1}}{\kappa_i} \frac{\delta_i}{\delta_{i+1}}} = \frac{\kappa_i \delta_{i+1} T_i + \kappa_{i+1} \delta_i T_{i+1}}{\kappa_i \delta_{i+1} + \kappa_{i+1} \delta_i}$$ [Expression 64]

From this expression, the following is obtained.

$$T_i - T_i^* = \frac{\kappa_{i+1} \delta_i (T_i - T_{i+1})}{\kappa_i \delta_{i+1} + \kappa_{i+1} \delta_i}$$ [Expression 65]

Thus, a heat flux from the layer i to the layer i+1 is obtained as follows.

$$J_i = \mu_i(T_i - T_{i+1}), \quad \mu_i = \frac{2\kappa_i \kappa_{i+1}}{\kappa_i \delta_{i+1} + \kappa_{i+1} \delta_i}$$ [Expression 66]

From the expressions described above, simultaneous equations represented by the following tridiagonal matrix are obtained.

$$\begin{pmatrix} b_1 & c_1 & 0 & 0 & \cdots & 0 & 0 & 0 \\ a_2 & b_2 & c_2 & 0 & \cdots & 0 & 0 & 0 \\ 0 & a_3 & b_3 & c_3 & \cdots & 0 & 0 & 0 \\ \vdots & \vdots & \vdots & \vdots & \ddots & \vdots & \vdots & \vdots \\ 0 & 0 & 0 & 0 & \cdots & a_{m-1} & b_{m-1} & c_{m-1} \\ 0 & 0 & 0 & 0 & \cdots & 0 & a_m & b_m \end{pmatrix} \begin{pmatrix} T_1^{new} \\ T_2^{new} \\ T_3^{new} \\ \vdots \\ T_{m-1}^{new} \\ T_m^{new} \end{pmatrix} = \begin{pmatrix} v_1 \\ v_2 \\ v_3 \\ \vdots \\ v_{m-1} \\ v_m \end{pmatrix}$$

[Expression 67]

where $T^{new}$ represents a temperature at a time point obtained by advancing a current time point by dt. Further, $a_1 = 0$ [Expression 68]

$b_1 = \mu_1/C_1 + \delta_1/dt$ $c_1 = -\mu_1/C_1$ $v_1 = \delta_1 T_1/dt + F_A/C_1$ $a_i = \mu_{i-1}/C_i$ [Expression 69]

$b_i = (\mu_{i-1} + \mu_i)/C_i + \delta_i/dt$ $c_i = -\mu_i/C_i$ $v_i = \delta_i T_i/dt$ $a_m = \mu_{m-1}/C_m$ [Expression 70]

$b_m = (\mu_{m-1} + \mu_m)/C_m + \delta_m/dt$ $c_m = 0$ $v_m = \delta_m T_m/dt - F_B/C_m$ <Operation and Effect of this Embodiment>

According to this embodiment, a temperature (pressure variation) of a surface (boundary between wall and atmosphere) of a building or the like in an urban space may be calculated taking into account reflection and the like from a building and the like and a ground surface. Further, by inputting, into the meteorological model, the meteorological data such as temperature, which represents the reality of the urban space obtained through the calculation, there may be obtained the meteorological data of the entire calculation area including the urban space, which reflects the influences from the urban space.

Example

FIGS. 7 to 10 are diagrams illustrating simulation results of surface temperatures of walls of buildings and the like in an actual urban space, which are obtained through the simulation method described above. In those figures, comparisons (temperature differences) are illustrated between the case of performing the calculation through the simulation method described above and the case of not taking into account the influences from the thermal radiation from other walls, ground surfaces, and the like.

In FIGS. 7 to 10, the ordinate axis represents a vertical direction, and the abscissa axis represents a horizontal direction. The width of one grid is set to 5 m for both the ordinate axis and the abscissa axis. As for the initial condition, the time point is set to 15:00, and the corresponding grids are assumed to have the same temperature in both the cases. FIGS. 7 to 10 illustrate temperature differences one second after 15:00:00, when the calculation is started. In FIGS. 7 to 10, the temperature differences between the case of this method and the case of not taking into account the influences from the thermal radiation are divided into three categories of "0.006° C. or larger", "0.003° C. or larger and less than 0.006° C.", and "less than 0.003° C." for display.

FIG. 7, FIG. 8, FIG. 9, and FIG. 10 are diagrams illustrating the simulation results of the surface temperatures of east-side walls, west-side walls, north-side walls, and south-side walls, respectively. In all the walls in the east, in the west, in the south, and in the north, large temperature differences are observed in lower-level portions, which are susceptible to the influences from the walls of other buildings and the like, the ground surfaces, and the like.

With the method according to the embodiment described above, the temperature of a surface of a building or the like in an urban space, which represents the reality more accurately, may be calculated taking into account the reflection and the like from the buildings and the like and the ground surfaces. Further, by inputting, into the meteorological model, the meteorological data such as temperature, which represents the reality of the urban space obtained through the calculation, the meteorological data of the entire calculation area may be obtained.

<Computer-Readable Recording Medium>

A program for causing a computer or another machine or device (hereinafter, referred to as computer or the like) to implement any one of the functions may be recorded on a recording medium readable from the computer or the like. Then, the program recorded on the recording medium is read and executed by the computer or the like, to thereby provide the function.

Here, the recording medium readable from the computer or the like is such a recording medium that accumulates information, such as data and programs, electrically, magnetically, optically, mechanically, or through chemical action, and is readable from the computer or the like. In such a medium, there may be provided components that constitute a computer, such as an operation section and a memory, to thereby cause the operation section to execute the program.

Further, of such recording media, examples of the recording media detachable from the computer or the like include a flexible disk, a magneto-optical disk, a CD-ROM, a CD-R/W, a DVD, a DAT, an 8-mm tape, and a memory card.

Further, examples of the recording media installed in the computer or the like include a hard disk and a read only memory (ROM).

The invention claimed is:

1. A meteorological simulation device, comprising:
topographic data acquiring means for acquiring topographic data including a latitude, a longitude, an elevation, and a geological feature of a predetermined area;
meteorological data acquiring means for acquiring, as meteorological data, at least one of a wind direction, a wind speed, a temperature, an air pressure, a humidity, and a piece of information equivalent thereto from a whole or a part of sites of the predetermined area;

three-dimensional data acquiring means for acquiring three-dimensional space data obtained by defining a three-dimensional space using a plurality of grids, the three-dimensional space data containing a plurality of three-dimensional objects and a ground surface of a partial area of the predetermined area;

meteorological data calculating means for calculating, based on the topographic data and the meteorological data, meteorological data of the predetermined area;

grid attribute data acquiring means for acquiring form factors of the plurality of grids of the partial area of the predetermined area, and attribute data of each grid, which includes an area and a reflectance of the each grid;

thermal radiation energy calculating means for calculating, as thermal radiation energy of the each grid, based on the area of the each grid, the form factor, the reflectance of the each grid, and a temperature of the each grid, which is calculated by the meteorological data calculating means, a sum of thermal radiation energy emitted from an own grid and thermal radiation energy obtained through reflection of a thermal radiation ray emitted from each grid;

boundary calculating means for calculating, based on the thermal radiation energy calculated by the thermal radiation energy calculating means, a flux between an atmosphere, and the plurality of three-dimensional objects and the ground surface, and pressure variation at boundaries between the atmosphere, and the plurality of three-dimensional objects and the ground surface;

boundary meteorological data calculating means for calculating, based on the flux and the pressure variation, meteorological data of the boundaries between the atmosphere, and the plurality of three-dimensional objects and the ground surface; and output means for outputting the meteorological data calculated by the meteorological data calculating means to an output device, wherein the meteorological data calculating means further calculates meteorological data of the predetermined area after a predetermined time period based on the meteorological data of the boundaries between the atmosphere, and the plurality of three-dimensional objects and the ground surface.

2. A meteorological simulation method, comprising:

an operation section acquiring topographic data including a latitude, a longitude, an elevation, and a geological feature of a predetermined area;

the operation section acquiring, as meteorological data, at least one of a wind direction, a wind speed, a temperature, an air pressure, a humidity, and a piece of information equivalent thereto from a whole or a part of sites of the predetermined area;

the operation section acquiring three-dimensional space data obtained by defining a three-dimensional space using a plurality of grids, the three-dimensional space data containing a plurality of three-dimensional objects and a ground surface of a partial area of the predetermined area;

the operation section calculating, based on the topographic data and the meteorological data, meteorological data of the predetermined area;

the operation section acquiring form factors of the plurality of grids of the partial area of the predetermined area, and attribute data of each grid, which includes an area and a reflectance of the each grid;

the operation section calculating, as thermal radiation energy of the each grid, based on the area of the each grid, the form factor, the reflectance of the each grid, and a calculated temperature of the each grid, a sum of thermal radiation energy emitted from an own grid and thermal radiation energy obtained through reflection of a thermal radiation ray emitted from each grid;

the operation section calculating, based on the calculated thermal radiation energy, a flux between an atmosphere, and the plurality of three-dimensional objects and the ground surface, and pressure variation at boundaries between the atmosphere, and the plurality of three-dimensional objects and the ground surface;

the operation section calculating, based on the flux and the pressure variation, meteorological data of the boundaries between the atmosphere, and the plurality of three-dimensional objects and the ground surface;

the operation section outputting the calculated meteorological data to an output device; and the operation section calculating meteorological data of the predetermined area after a predetermined time period based on the meteorological data of the boundaries between the atmosphere, and the plurality of three-dimensional objects and the ground surface.

3. A meteorological simulation device, comprising:

an interface which performs input and output with respect to an external device;

a communication section which receives topographic data and meteorological data inputted through said interface, the topographic data including a latitude, a longitude, an elevation, and a geological feature of a predetermined area, and the meteorological data including at least one of a wind direction, a wind speed, a temperature, an air pressure, a humidity, and a piece of information equivalent thereto from a whole or a part of sites of the predetermined area;

a storage section storing the topographic data and the meteorological data; and an operation section configured to:

acquire the topographic data and the meteorological data from said storage section;

acquire three-dimensional space data obtained by defining a three-dimensional space using a plurality of grids, the three-dimensional space data including a plurality of three-dimensional objects and a ground surface of a partial area of the predetermined area;

calculate, based on the topographic data and the meteorological data, meteorological data of the predetermined area;

acquire form factors of the plurality of grids of the partial area of the predetermined area, and attribute data of each grid, which includes an area and a reflectance of the each grid;

calculate, as thermal radiation energy of the each grid, based on the area of the each grid, the form factor, the reflectance of the each grid, and a calculated temperature of the each grid, a sum of thermal radiation energy emitted from an own grid and thermal radiation energy obtained through reflection of a thermal radiation ray emitted from each grid;

calculate, based on the calculated thermal radiation energy, a flux between an atmosphere, and the plurality of three-dimensional objects and the ground surface, and pressure variation at boundaries between the atmosphere, and the plurality of three-dimensional objects and the ground surface;

calculate, based on the flux and the pressure variation, meteorological data of the boundaries between the atmosphere, and the plurality of three-dimensional objects and the ground surface;

transfer the calculated meteorological data to said interface to output the calculated meteorological data to the external device; and calculate meteorological data of the predetermined area after a predetermined time period based on the meteorological data of the boundaries between the atmosphere, and the plurality of three-dimensional objects and the ground surface.

4. A non-transitory computer-readable storage medium containing a meteorological simulation program causing a computer to execute:

acquiring topographic data including a latitude, a longitude, an elevation, and a geological feature of a predetermined area;

acquiring, as meteorological data, at least one of a wind direction, a wind speed, a temperature, an air pressure, a humidity, and a piece of information equivalent thereto from a whole or a part of sites of the predetermined area;

acquiring three-dimensional space data obtained by defining a three-dimensional space using a plurality of grids, the three-dimensional space data including a plurality of three-dimensional objects and a ground surface of a partial area of the predetermined area;

calculating, based on the topographic data and the meteorological data, meteorological data of the predetermined area;

acquiring form factors of the plurality of grids of the partial area of the predetermined area, and attribute data of each grid, which includes an area and a reflectance of the each grid;

calculating, as thermal radiation energy of the each grid, based on the area of the each grid, the form factor, the reflectance of the each grid, and a calculated temperature of the each grid, a sum of thermal radiation energy emitted from an own grid and thermal radiation energy obtained through reflection of a thermal radiation ray emitted from each grid;

calculating, based on the calculated thermal radiation energy, a flux between an atmosphere, and the plurality of three-dimensional objects and the ground surface, and pressure variation at boundaries between the atmosphere, and the plurality of three-dimensional objects and the ground surface;

calculating, based on the flux and the pressure variation, meteorological data of the boundaries between the atmosphere, and the plurality of three-dimensional objects and the ground surface;

outputting the calculated meteorological data to an output device; and calculating meteorological data of the predetermined area after a predetermined time period based on the meteorological data of the boundaries between the atmosphere, and the plurality of three-dimensional objects and the ground surface.

* * * * *